United States Patent [19]

Lange

[11] Patent Number: 5,506,794

[45] Date of Patent: Apr. 9, 1996

[54] APPARATUS AND METHOD FOR CALIBRATING A SENSOR SYSTEM USING THE FAST KALMAN FILTERING FORMULA

[76] Inventor: Antti A. I. Lange, Liisankatu 15A10, Helsinki, Finland, SF-00170

[21] Appl. No.: 768,770

[22] Filed: Oct. 9, 1991

[30] Foreign Application Priority Data

Apr. 28, 1989 [FI] Finland ................... 892071
Dec. 22, 1989 [FI] Finland ................... 896219

[51] Int. Cl.[6] ........................................ G06F 19/00
[52] U.S. Cl. ...................... 364/571.01; 364/571.02; 364/724.2
[58] Field of Search ................... 364/571.01, 571.02, 364/571.03, 571.07, 571.05, 724.2

[56] References Cited

U.S. PATENT DOCUMENTS

| | | | |
|---|---|---|---|
| 4,347,730 | 9/1982 | Fisher et al. | 73/1 E |
| 4,472,812 | 9/1984 | Sakaki et al. | 375/14 |
| 4,669,052 | 5/1987 | Bianco | 364/571 |
| 4,727,492 | 2/1988 | Reeve et al. | 364/424 |
| 4,760,596 | 7/1988 | Agrawal et al. | 379/410 |
| 4,783,774 | 11/1988 | Yueh | 364/454 |

*Primary Examiner*—Edward R. Cosimano

[57] ABSTRACT

A method and apparatus for calibrating a sensor system output that includes a logic unit (1) for receiving uncalibrated sensor signals from a centralized sensor system (3) and for reading/writing data from/to a data base unit (2) that contains updated information on all control (4) and performance aspects of the sensors. Based upon these inputs, the logic unit (1) can provide real-time or near real-time optimum calibration (5) of the sensors by using the Fast Kalman Filtering (FKF) method when the stability conditions of standard Kalman Filtering are met by the sensor system.

3 Claims, 2 Drawing Sheets

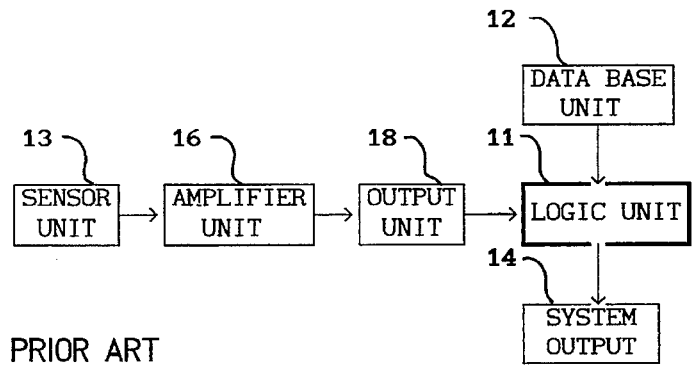
FIGURE 1: PRIOR ART
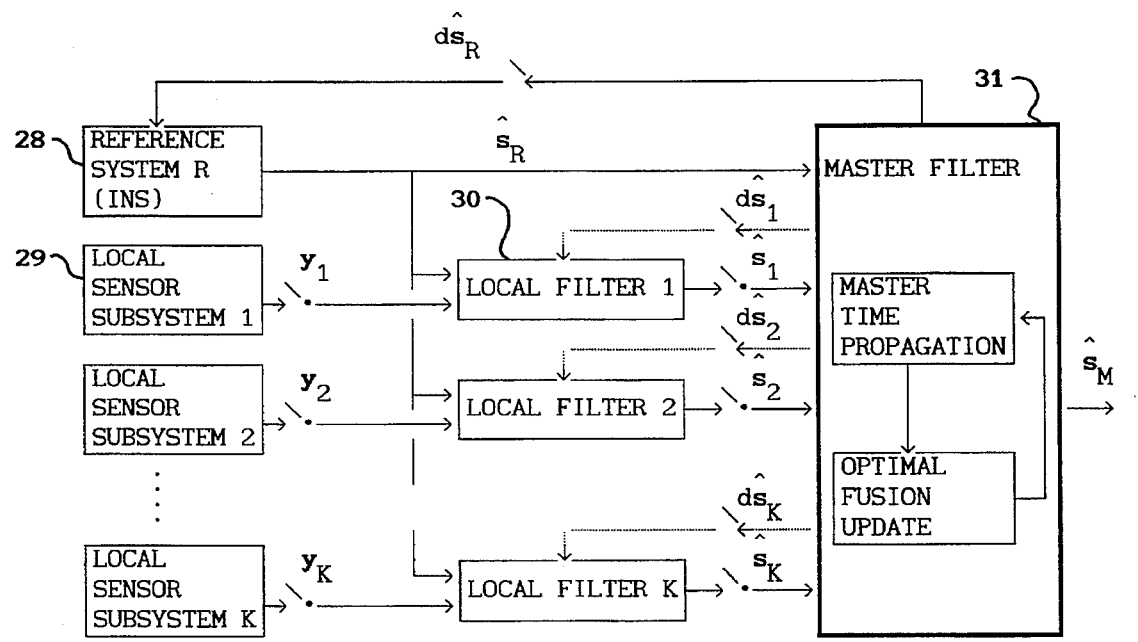
FIGURE 2: PRIOR ART

APPARATUS AND METHOD FOR CALIBRATING A SENSOR SYSTEM USING THE FAST KALMAN FILTERING FORMULA

TECHNICAL FIELD

This invention relates generally to sensor signal processing and more particularly to the calibration and standardization of sensor outputs using multiple sensor systems.

BACKGROUND ART

Electrically controlled systems often respond, at least in part, to external events. Sensors of various kinds are typically utilized to allow such a system to monitor the desired external events. Such sensors provide predictable electrical responses to specific environmental stimuli. Sensors are comprised of one or more components, and such components are usually only accurate within some degree of tolerance. As a result, sensors are calibrated prior to installation and use.

However, such calibration techniques are relatively costly. Instead, a data base can be empirically prepared for each sensor to relate that sensor's output to known environmental influences. Such an apparatus and method for calibrating a sensor was recently patented (PCT/US86/00908; see WO 87/00267 of Jan. 15, 1987). However, such a complete empirical data base may still be much too expensive to prepare and update in real-time for every sensor of a large sensor system.

Fortunately, it has turned out that there seldom is an absolute need for such an empirical data base if the sensor system only has some data-redundancy or overdetermination in it (see Antti A. Lange, 1986: "A High-pass Filter for Optimum Calibration of Observing Systems with Applications"; pages 311–327 of "Simulation and Optimization of Large Systems", edited by Andrzej J. Osiadacz and published by Clarendon Press/Oxford University Press, Oxford, UK, 1988a).

It has for a much longer time been known how the calibration of relatively small sensor systems can be maintained in real-time by using various computational methods under the general title of Kalman Filtering (Kalman, 1960; and Kalman and Bucy, 1961). However, certain stability conditions must be satisfied otherwise all the estimated calibration and other desired parameters may start to diverge towards false solutions when continuously updated again and again.

Fortunately, certain observability and controllability conditions guarantee the stability of an optimal Kalman Filter. These conditions together with a strict optimality usually require that a full measurement cycle or even several cycles of an entire multiple sensor system should be able to be processed and analysed at one time. However, this has not been possible in large real-time applications. Instead, much faster suboptimal Kalman Filters using only a few measurements at a time are exploited in the real-time applications of navigation technology and process control.

Unfortunately, the prior art real-time calibration techniques either yield the severe computation loads of optimal Kalman Filtering or their stability is more or less uncertain as it is the situation with suboptimal Kalman Filtering and Lange's High-pass Filter. A fast Kalman Estimation algorithm has been reported but it only applies to a restricted problem area (Falconer and Ljung, 1978: "Application of Fast Kalman Estimation to Adaptive Equalization", IEEE Transactions on Communications, Vol. COM-26, No. 10, October 1978, pages 1439–1446).

There exists a need for a calibration apparatus and method for large sensor systems that offers broad application and equal or better computational speed, reliability, accuracy, and cost benefits.

SUMMARY OF THE INVENTION

These needs are substantially met by provision of the apparatus and method for calibrating a sensor system in real-time or in near real-time as described in this specification. Through use of this apparatus and method, unreliable trim points and most expensive internal calibration techniques can be eliminated from the sensors. Instead, a data base is created from more or less scratch and updated in real-time for the entire multiple sensor system. In addition, to aid convergence and accuracy of the measuring process, entirely uncalibrated but otherwise predictable sensors can be included in the sensor system.

Pursuant to the apparatus of the invention, a microcomputer or other element capable of performing in real-time or near real-time the specified logic functions receives output from a system of several sensor units, accesses a data base, and determines readings of the sensor units in view of the data base information to yield standardized calibrated outputs and updates the data base information; and, pursuant to the method of invention, the logic functions are based on such a revision of Lange's High-pass Filter for Optimum Calibration of Observing Systems that transforms the filter into a Kalman Filter.

BRIEF DESCRIPTION OF THE DRAWINGS

These and other attributes of the invention will become more clear upon making a thorough review and study of the following description of the best mode for carrying out the invention, particularly when reviewed in conjunction with the drawings, wherein:

FIG. 1 comprises a block diagram depiction of a prior art sensor and calibration unit;

FIG. 2 comprises a block diagram depiction of a prior art apparatus and method for calibrating a large sensor system (based on so-called decentralized Kalman Filtering);

BEST MODE FOR CARRYING OUT THE INVENTION

Figure 3:
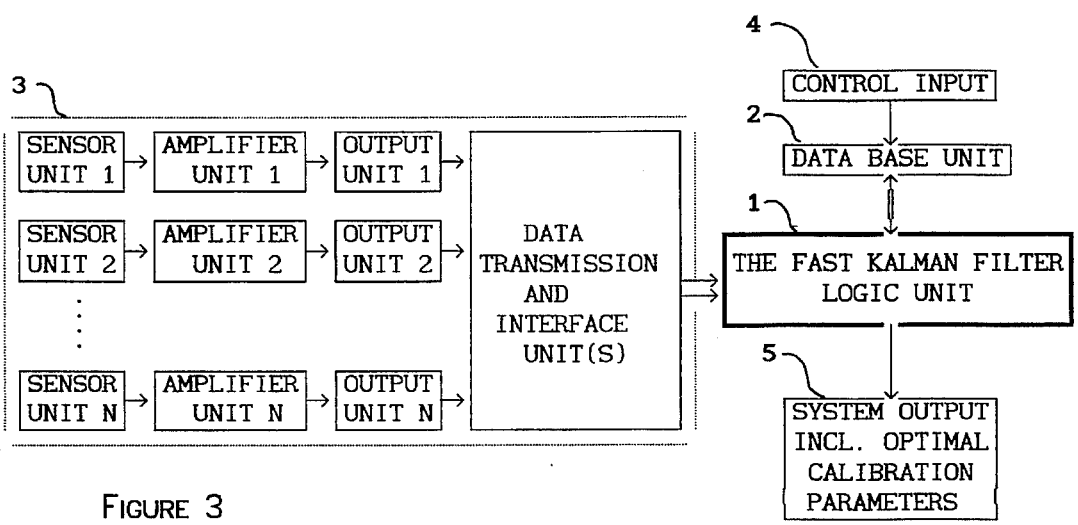
FIG. 3 comprises a block diagram of the apparatus of the invention (based on so-called centralized Kalman Filtering)

Prior to explaining the invention, it will be helpful to first understand the prior art calibration technique of FIG. 1. A typical prior art sensor and calibration unit includes a logic unit (11) and a data base unit (12). The sensor signal from a sensor unit (13) proceeds directly through an amplifier/transmission (16) unit to an output/interface unit (18). Based upon this input and upon the information contained in the data base unit (12), the logic unit (11) then provides a calibrated sensor reading (14)—the system output—for use as desired.

Referring now to FIG. 3, the apparatus of the invention has been outlined. It includes generally a logic unit (1) and a data base unit (2) that operate in conjunction with a centralized multiple sensor system (3). The data base unit (2)

provides storage for all information on most recent control and performance aspects of the sensors including, if any, test point sensor output values and the corresponding empirically determined external event values. The logic unit (1) receives sensor outputs from the sensor system (3), and accesses the data base unit (2). The control input (4) includes information on calibration adjustments made. Based on these inputs, the logic unit (1) provides the outputs (5) that comprise updated calibration data, sensor readings and monitoring information on the desired external events. Prior to explaining the invented Fast Kalman Filtering (FKF) method pursuant to the way in which the logic unit (1) is used, it will be helpful to first understand some fundamentals of Kalman Filtering.

An optimal recursive filter is one for which there is no need to store all past measurements for the purpose of computing present estimates of the state parameters. This is the Markov property of a stochastic process and fundamental to optimal Kalman Filtering. For the wind-tracking apparatus of FIG. 4 the position coordinates of the weather balloon—and, as we shall soon see, all more or less unknown calibration parameters of the tracking sensors as well—are referred to as the state of the system.

The process is described by the equations from (1) to (3). The first equation tells how a measurement vector $y_t$ depends on the state vector $s_t$ at timepoint t, (t=0,1,2. . .). This is the linearized Measurement (or observation) equation:

$$y_t = H_t s_t + e_t \qquad (1)$$

The design matrix $H_t$ is typically composed of the partial derivatives of the actual Measurement equations. The second equation describes the time evolution of e.g. a weather balloon flight and is the System (or state) equation:

$$s_t = s_{t-1} + u_{t-1} + a_t$$

$$(\text{or, } s_t = A\, s_{t-1} + B\, u_{t-1} + a_t \text{ more generally}) \qquad (2)$$

which tells how the balloon position is composed of its previous position $s_{t-1}$ as well as of increments $u_{t-1}$ and $a_t$. These increments are typically caused by a known uniform motion and an unknown random acceleration, respectively.

The measurement errors, the acceleration term and the previous position usually are mutually uncorrelated and are briefly described here the following covariance matrices:

$$\begin{aligned} R_{e_t} &= Cov(e_t) = E(e_t e_t') \\ R_{a_t} &= Cov(a_t) = E(a_t a_t') \\ \text{and} \\ P_{t-1} &= Cov(\hat{s}_{t-1}) = E\{(\hat{s}_{t-1} - s_{t-1})(\hat{s}_{t-1} - s_{t-1})'\} \end{aligned} \qquad (3)$$

The Kalman forward recursion formulas give us the best linear unbiased estimates of the present state $$\hat{s}_t = \hat{s}_{t-1} + u_{t-1} + K_t\{y_t - H_t(\hat{s}_{t-1} + u_{t-1})\} \qquad (4)$$

and its covariance matrix $$P_t = Cov(\hat{s}_t) = P_{t-1} - K_t H_t' P_{t-1} \qquad (5)$$

where the Kalman gain matrix $K_t$ is defined by $$K_t = (P_{t-1} + R_{a_t}) H_t' \{H_t(P_{t-1} + R_{a_t}) H_t' + R_{e_t}\}^{-1} \qquad (6)$$

Let us now partition the estimated state vector $\hat{s}_t$ and its covariance matrix $P_t$ as follows:

$$\hat{s}_t = \begin{bmatrix} \hat{b}_t \\ \hat{c}_t \end{bmatrix}, P_t = Cov(\hat{s}_t) = \begin{bmatrix} P_{b_t} & Cov(\hat{b}_t, \hat{c}_t) \\ Cov(\hat{c}_t, \hat{b}_t) & P_{c_t} \end{bmatrix} \qquad (7)$$

where $\hat{b}_t$ tells us the estimated balloon position; and, $\hat{c}_t$ the estimated calibration parameters.

The respective partitioning of the other quantities will then be as follows:

$$H_t = [H_{b_t}\ H_{c_t}] = [X_t\ G_t],\ u_t = \begin{bmatrix} u_{b_t} \\ u_{c_t} \end{bmatrix},\ a_t = \begin{bmatrix} a_{b_t} \\ a_{c_t} \end{bmatrix}, \qquad (8)$$

and, $$R_{a_t} = \begin{bmatrix} R_{a_{b_t}} & Cov(a_{b_t}, a_{c_t}) \\ Cov(a_{c_t}, a_{b_t}) & R_{a_{c_t}} \end{bmatrix}$$

The recursion formulas from (4) to (6) give us now a filtered (based on updated calibration parameters) position vector $$\hat{b}_t = \hat{b}_{t-1} + u_{b_{t-1}} + K_{b_t}\{y_t - H_t(\hat{s}_{t-1} + u_{t-1})\} \qquad (9)$$

and the updated calibration parameter vector $$\hat{c}_t = \hat{c}_{t-1} + u_{c_{t-1}} + K_{c_t}\{y_t - H_t(\hat{s}_{t-1} + u_{t-1})\} \qquad (10)$$

The Kalman gain matrices are respectively $$K_{b_t} = (P_{b_{t-1}} + R_{a_{b_t}})\, H_{b_t}'\, \{H_t(P_{t-1} + R_{a_t}) H_t' + R_{e_t}\}^{-1} + \ldots \qquad (11)$$
and
$$K_{c_t} = (P_{c_{t-1}} + R_{a_{c_t}})\, H_{c_t}'\, \{H_t(P_{t-1} + R_{a_t}) H_t' + R_{e_t}\}^{-1} + \ldots$$

Equation (9) specifies a high-pass filter because it suppresses from the position coordinates all those "noise" effects that stem from constant or slow-varying calibration errors of the tracking sensors. Its frequency responses depend on the calibration stability of each sensor and optimal tuning takes place automatically. However, one must use accurate estimates for the covariance matrices $P_{t=0}$, $R_{e_t}$ and $R_{a_t}$ as well as to keep track of recalibration or adjustments $u_{c_{t-1}}$ of the sensors at all timepoints t, t=1,2, . . . Equation (10) specifies a low-pass filter because it suppresses the random noise $a_{c_t}$ from the calibration parameters and it can be used for updating the calibration parameter vector. It resembles an exponential smoothing filter where the weights of the moving averaging come from (11).

Because the calibration parameters are very closely related to the measurements a design matrix $H_t$ usually has linearly dependent column vectors. This will cause numerical problems unless adequate precautions are taken. Firstly, an initialization is needed for adequate initial guesses of the position vector $b_{t=0}$ and the calibration vector $c_{t=0}$. Lange's High-pass Filter (Lange, 1988a) can extract this information from all available data sources e.g. instrument calibration, laboratory tests, intercomparisons and archived measurements. Secondly, the well-known stability conditions of Kalman Filtering should also be satisfied otherwise truncation and roundoff errors may gradually contaminate the filtering results (see e.g. Gelb, 1974: "Applied Optimal Estimation", MIT Press, page 132).

The stability of a Kalman Filter refers to the behaviour of estimated parameters when measurements are suppressed. The calibration parameters typically are unobservable during many external events. In fact, the number of measurements must always be greater than that of entirely unknown state parameters. This is a matter of great practical importance for all observing systems with many calibration parameters to be estimated. The very necessary observability condition can usually be satisfied by processing the incoming sensor signals in large data batches or, alternatively, employing tests for "whiteness" on long time series of the residuals e and making the corrective actions when established. In fact, for a truly optimal Kalman Filter, not only the Kalman Gain matrices (11) but the volume of a data batch also depend on the state and model parameters in dynamic fashion. Prior art methods use the Kalman Recursions (4) to (6) for estimating these parameters.

Now, we introduce the following modified form of the State equation $$\hat{s}_{t-1} + u_{t-1} = I\, s_t + (\hat{s}_{t-1} - s_{t-1}) - a_t \qquad (12)$$

where $\hat{s}$ represents an estimated value of a state vector s. We combine it with the Measurement equation (1) in order to obtain so-called Augmented Model:

$$\begin{bmatrix} y_t \\ \hat{s}_{t-1} + u_{t-1} \end{bmatrix} = \begin{bmatrix} H_t \\ I \end{bmatrix} s_t + \begin{bmatrix} e_t \\ (\hat{s}_{t-1} - s_{t-1}) - a_t \end{bmatrix} \qquad (13)$$

i.e. $z_t = Z_t\, s_t + \epsilon_t$

The state parameters can now be computed by using the well-known solution of a Regression Analysis problem given below. We use it for Updating:

$$\hat{s}_t = (Z'_t V_t^{-1} Z_t)^{-1} Z'_t V_t^{-1} z_t \qquad (14)$$

The result is algebraically equivalent to use of the Kalman Recursions but not numerically (see e.g. Harvey, 1981: "Time Series Models", Philip Allan Publishers Ltd, Oxford, UK, pp. 101–119). For the balloon tracking problem with a large number sensors with slipping calibration the matrix to be inverted in equations (6) or (11) is larger than that in formula (14).

The initialization of the large optimal Kalman Filter for solving the calibration problem of the balloon tracking sensors is done by Lange's High-pass Filter. It exploits an analytical sparse-matrix inversion formula (Lange, 1988a) for solving regression models with the following so-called Canonical Block-angular matrix structure:

$$\begin{bmatrix} y_1 \\ y_2 \\ \cdot \\ \cdot \\ \cdot \\ y_K \end{bmatrix} = \begin{bmatrix} X_1 & & & & G_1 \\ & X_2 & & & G_2 \\ & & \cdot & & \cdot \\ & & & \cdot & \cdot \\ & & & & \cdot \\ & & & & X_K\; G_K \end{bmatrix} \begin{bmatrix} b_1 \\ b_2 \\ \cdot \\ \cdot \\ b_K \\ c \end{bmatrix} + \begin{bmatrix} e_1 \\ e_2 \\ \cdot \\ \cdot \\ \cdot \\ e_K \end{bmatrix} \qquad (15)$$

This is a matrix representation of the Measurement equation of an entire windfinding intercomparison experiment or one balloon flight. The vectors $b_1, b_2, \ldots, b_K$ typically refer to consecutive position coordinates of a weather balloon but may also contain those calibration parameters that have a significant time or space variation. The vector c refers to the other calibration parameters that are constant over the sampling period.

Updating of the state parameters including the calibration drifts in particular, is based on optimal Kalman filtering. However, the Kalman Recursions would now require the inversions of the very large matrices in equations (6) or (11) because measurements must be processed in large data batches in order to create observability for the calibration parameters. A data batch usually is a new balloon flight.

Figure 4:
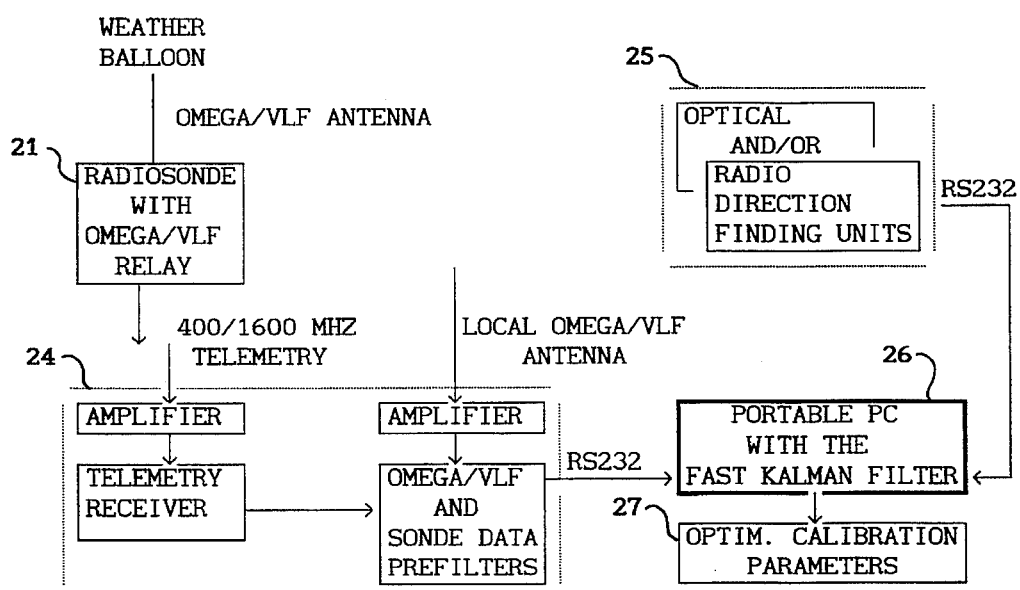
FIG. 4 comprises a schematic diagram of an example of a preferred embodiment of the apparatus of the invention.

Fortunately, the Regression Analytical approach leads almost to the same block-angular matrix structure as in equation (15). The optimal estimates (^) of $b_1, b_2, \ldots, b_K$ and c are obtained by making the following logical insertions into formula (15) for each timepoint t, t=1,2, . . .:

$$y_k := \begin{bmatrix} y_{t,k} \\ \hat{b}_{t-1,k} + u_{b_{t-1,k}} \end{bmatrix} ; X_k := \begin{bmatrix} X_{t,k} \\ I \end{bmatrix} ; \qquad (16)$$

$$G_k := \begin{bmatrix} G_{t,k} \\ \cdot \end{bmatrix} ; b_k := b_{t,k};\ \text{and,}$$

$$e_k := \begin{bmatrix} e_{t,k} \\ (\hat{b}_{t-1,k} - b_{t-1,k}) - a_{b_{t,k}} \end{bmatrix} ; \text{for } k = 1, \ldots K;$$

and,
$y_{K+1} := \hat{c}_{t-1} + u_{c_{t-1}};\ X_{K+1} := [\text{empty}];$
$G_{K+1} := [I];\ c := c_t;\ \text{and},\ e_{K+1} := (\hat{c}_{t-1} - c_{t-1}) - a_{c_t}$ These insertions conclude the specification of the Fast Kalman Filter (FKF) algorithm for the embodiment of the invention for calibrating the upper-air wind tracking system of FIG. 4.

Another preferred mode for carrying out the invention is the Global Observing System of the World Weather Watch. Here, the vector $y_k$ contains various observed inconsistencies and systematic errors of weather reports (e.g. mean day-night differences of pressure values which should be about zero) from a radiosonde system k or from a homogeneous cluster k of radiosonde stations of a country (Lange, 1988a and 1988b: "Determination of the radiosonde biases by using satellite radiance measurements", WMO Instruments and Observing Methods Report No. 33, 201–206). The calibration drift vector $b_k$ will then tell us what is wrong and to what extent. The calibration drift vector c refers to errors of a global nature or which are more or less common to all observing systems (e.g. biases in satellite radiances and in their vertical weighting functions or some atmospheric tide effects).

For all large multiple sensor systems their design matrices H typically are sparse. Thus, one can usually perform Partitioning: $s_t =$ \qquad (17)

$$\begin{bmatrix} b_{t,1} \\ \cdot \\ \cdot \\ b_{t,K} \\ c_t \end{bmatrix}\ y_t = \begin{bmatrix} y_{t,1} \\ y_{t,2} \\ \cdot \\ \cdot \\ y_{t,K} \end{bmatrix}\ H_t = \begin{bmatrix} X_{t,1} & & & & G_{t,1} \\ & X_{t,2} & & & G_{t,2} \\ & & \cdot & & \cdot \\ & & & \cdot & \cdot \\ & & & & X_{t,K}\; G_{t,K} \end{bmatrix}$$

where $c_t$ typically represents calibration parameters at time t; and, $b_{t,k}$ all other state parameters in the time and/or space volume.

If the partitioning is not obvious one may try to do it automatically by using a specific algorithm that converts every sparse linear system into the above Canonical Block-angular Form (Weil and Kettler, 1971: "Rearranging Matrices to Block-angular Form for Decomposition (and other) Algorithms", Management Science, Vol. 18, No. 1, September 1971, pages 98–107).

Augmented model for a space volume case: see equations (15) and (16).

Augmented Model for a moving time volume (length L):

$$\begin{bmatrix} y_t \\ \hat{s}_{t-1} + u_{t-1} \\ y_{t-1} \\ \hat{s}_{t-2} + u_{t-2} \\ \cdot \\ \cdot \\ \cdot \\ \overline{y_{t-L+1}} \\ \hat{s}_{t-L} + u_{t-L} \\ \hat{c}_{t-1} + u_{c_{t-1}} \end{bmatrix} = \begin{bmatrix} H_t & F_t \\ I & \overline{F_{t-1}} \\ H_{t-1} & - \\ I & \cdot \\ \overline{\phantom{xxx}} & \cdot \\ \cdot & \cdot \\ - & F_{t-L+1} \\ H_{t-L+1} & - \\ I & I \\ - & - \end{bmatrix} \begin{bmatrix} s_t \\ s_{t-1} \\ \cdot \\ \cdot \\ \cdot \\ s_{t-L+1} \\ c_t \end{bmatrix} + \begin{bmatrix} \hat{e}_t \\ (\hat{s}_{t-1} - s_{t-1}) - a_t \\ \overline{e_{t-1}} \\ (\hat{s}_{t-2} - s_{t-2}) - a_{t-1} \\ \cdot \\ \cdot \\ \cdot \\ \overline{e_{t-L+1}} \\ (\hat{s}_{t-L} - s_{t-L}) - a_{t-L+1} \\ (\hat{c}_{t-1} - c_{t-1}) - a_{c_t} \end{bmatrix} \quad (18)$$

i.e. $Z_t = Z_t S_t + e_t$ and where vector $C_t$ represents all those calibration parameters that are constants in the moving volume. As previously, we proceed with Updating: $\hat{S}_t = \{Z'_t V^{-1} Z_t\}^{-1} Z'_t V^{-1} Z_t$ \quad (19)

Please observe, that the gigantic matrix Z takes a nested block-angular form when adding the space domain. Lange's High-pass Filter can be revised to cope with all such sparsities of Augmented Models.

The Fast Kalman Filter (FKF) formulas for the recursion step at any timepoint t are as follows:

$\hat{s}_{t-l} = \{X_{t-l}' V_{t-l}^{-1} X_{t-l}\}^{-1} X_{t-l}' V^{-1}(y_{t-l} - G_{t-l}\hat{c}_t)$ \quad (20)
for $l = 0, 1, 2, \ldots, L - 1$ $\hat{c}_t = \left\{ \sum_{l=0}^{L} G_{t-l}' R_{t-l} G_{t-l} \right\}^{-1} \sum_{l=0}^{L} G_{t-l}' R_{t-l} y_{t-l}$ where, for $l = 0, 1, 2, \ldots, L - 1$,
$R_{t-l} = V_{t-l}^{-1}\{I - X_{t-l}\{X_{t-l}' V_{t-l}^{-1} X_{t-l}\}^{-1} X_{t-l}' V_{t-l}^{-1}\}$ $V_{t-l} = \begin{bmatrix} Cov(e_{t-l}) & \\ & Cov\{A(\hat{s}_{t-l-1} - s_{t-l-1}) - a_{t-l}\} \end{bmatrix}$ $y_{t-l} = \begin{bmatrix} y_{t-l} \\ A\hat{s}_{t-l-1} + Bu_{t-l-1} \end{bmatrix}$ $X_{t-l} = \begin{bmatrix} H_{t-l} \\ \overline{I} \end{bmatrix}$ $G_{t-l} = \begin{bmatrix} F_{t-l} \\ \overline{\phantom{xx}} \end{bmatrix}$ and, i.e. for $l = L$,
$R_{t-L} = V_{t-L}^{-1}$
$V_{t-L} = Cov\{A(\hat{c}_{t-1} - c_{t-1}) - a_{c_t}\}$
$y_{t-L} = A\hat{c}_{t-1} + Bu_{c_{t-1}}$
$G_{t-L} = I$.

When the state vectors are also decoupled in the space domain those subsystems are indicated by equations (17), (16) and (15). In fact, Lange's revised High-pass Filter algorithm as specified by the formulas (20) will do the whole job in one go if only the detailed substructures are permuted to conform with the overall block-angular form of equation (18).

For a Continuous Kalman Filter: $u_t = F(t) \Delta t \, b_t$ (Gelb 1974, pp.122–124).

Referring now to FIG. 2, a specific embodiment of a prior art navigation system using a decentralized Kalman Filtering technique will be explained. As suggested by the block diagram, Federated Filtering (Neal A. Carlson, 1988: "Federated Filter for Fault-Tolerant Integrated Navigation Systems", Proceedings of the IEEE 1988 PLANS, IEEE AES Society, see FIG. 1 on page 111) is a two-stage data processing technique in which the outputs of local, sensor-related filters (30) are subsequently processed and combined by a larger master filter (31). Each local filter is dedicated to a separate subsystem (29) of sensors. One or more local filters (30) may also use data from a common reference system (28), e.g., an inertial navigation system (INS). The advantages over an prior art centralized Kalman filtering technique are an increased total system throughput by parallel operation of local filters and a further increase of system throughput by using the local filters for data compression. Approaches of this kind have been absolutely necessary for large multi-sensor navigation systems because of high-speed computing requirements. From the viewpoint of a prior art centralized Kalman Filter of a large sensor system, these approaches for speeding up the computations fall into the two general categories of approximative methods i.e. decoupling states and prefiltering for data compression (see e.g. Gelb, 1974: "Applied Optimal Estimation", MIT Press, pages 289–291). The disadvanges are that an approximative Kalman Filter never is strictly optimal and, consequently, its stability becomes more or less uncertain. In any case, the stability is more difficult to establish in a theoretically rigorous way.

Referring now to FIG. 3, a block diagram of the apparatus of the invention that makes use of a theoretically sound yet practical centralized Kalman Filtering method will be described.

As can be seen by comparing FIGS. 1 and 3, the logic unit (1) of the invention has a two-way communication link to the data base unit (2) whereas the prior art logic unit (11) can only read from its data base unit (12). In order the prior art sensor and calibration unit to operate properly, the data base unit (12) must have an appropriate collection of data regarding sensor (13) performance. Such information must be empirically established, and often needs to be re-established at adequate intervals, for each individual sensor (13) by sequentially exposing each sensor (13) to a number of known external events of known magnitudes. This is not possible in many eases of practical importance; consider e.g. a radiometric sensor of an orbiting weather satellite. In contrast, the logic unit (1) of the invention has a capability of stretching and updating the calibration information collected in its data base (2) assuming only that a certain observability condition of Kalman Filtering is satisfied.

As can be seen by comparing FIGS. 2 and 3, the Federated Kalman Filter solution is the same as that of a single, centralized Kalman Filter only if the information fusion and division operations are performed after every local filter measurement update cycle (and when the master filter should be able to cope with the large Kalman Filtering problem without any help from decoupling states). Thus, the prior art solution of FIG. 2 is theoretically inferior because it is a full centralized Kalman Filter solution of FIG. 3 that yields optimal results as shown by Kalman in 1960 or, in fact, by Gauss and Markov already in the early 1800. However, the computation load of a prior art centralized Kalman Filter is proportional to $n^3$ where n is the number of the state parameters i.e. the number of all unknown quantities that need to be solved for an update of the process parameter estimates.

Referring now to FIG. 4, a block diagram of the invented calibration apparatus for an upper-air wind tracing system of the will be described. A balloon-borne radiosonde (21) receives Omega/VLF navigation signals and retransmits them to a ground-based receiver and preprocessing unit (24). Optical and/or radio direction finding devices (25) are also connected to the PC system (26) equipped with the Fast Kalman Filtering (FKF) software. Optimal calibration parameters (27) for correction of misalignments and bearing anomalies are solved with an improving accuracy depending on the information content of incoming data.

Pursuant to use of this apparatus and method, simple and inexpensive sensors can be fully exploited without too much regard for their internal calibration provisions and the speed of logic units. Despite use of entirely uncalibrated but predictable sensors, accurate results can be obtained in real-time applications through use of the calibration and standardization method and apparatus disclosed herein.

The invented Fast Kalman Filtering (FKF) method is based on the general principle of decoupling states. The use of Lange's analytical sparse-matrix inversion method is pursuant to the invention (see e.g. Lange, 1988a). Because the solution is straightforward and exact the optimality of a large centralized Kalman Filter can be achieved with a hard-to-beat computational efficiency.

Those skilled in the art will appreciate that many variations could be practiced with respect to the above described invention without departing from the spirit of the invention. Therefore, it should be understood that the scope of the invention should not be considered as limited to the specific embodiment described, except in so far as the claims may specifically include such limitations.

I claim:

1. A calibration device for use with a flow-tracking system, the device comprising the following subsystems, control facilities and a processing unit of which at least some are integral parts of the flow-tracking system:
   (A) flow-driven subsystem(s) including
      (i) means for capturing position location signals,
      (ii) means for forwarding said signals;
   (B) receiver subsystem(s) including
      (i) means for receiving said forwarded signals,
      (ii) means for connecting to said processing unit;
   (C) said processing unit including
      (i) means for acquiring values of said forwarded signals,
      (ii) data base means for storing information on calibration of said subsystems and on differences between said values and expected values of said forwarded signals,
      (iii) means for computing tracks of said flow-driven subsystem(s) for alternative configurations of said subsystems, said expected values from said computed tracks, said differences and calibration updates by processing said computed differences initially with Lange's High-pass Filter for a calibration of entirely uncalibrated subsystems, if there are any, and subsequently with the Fast Kalman filter (FKF); and,
   (D) said control facilities including
      (i) means for altering configuration of said calibration device by coupling/decoupling each of said subsystems to/from said device,
      (ii) means for acquiring precalibration, accuracy and system noise data of said subsystems,
      (iii) means for communicating with said processing unit,
      (iv) means for monitoring stability of said computed calibration updates for each of said alternative configurations, and
      (v) means for selecting one of said alternative configurations whose calibration updates exhibit a proper convergence, and thereby providing a stable calibration for all those integral parts of said flow-tracking system which are coupled to said device.

2. A large calibration apparatus for use with a state-finding system, the apparatus comprising the following subsystems, control facilities and a processing unit of which at least some are integral parts of the state-finding system and which together exploit more than 50 sensor signals simultaneously:
   (A) sensor subsystems including
      (i) means for capturing signals,
      (ii) means for forwarding said captured signals;
   (B) transmission subsystems including
      (i) means for receiving said forwarded signals,
      (ii) means for connecting to said processing unit;
   (C) said processing unit including
      (i) means for acquiring values of said forwarded signals,
      (ii) data base means for storing information on calibration of said subsystems and on differences between said values and expected values of said forwarded signals,
      (iii) means for computing state parameters, said expected values from said computed parameters, said differences and calibration updates by processing said computed differences initially with Lange's High-pass Filter for a calibration of entirely uncalibrated subsystems, if there are any, and subsequently with the Fast Kalman Filter (FKF); and,
   (D) said control facilities including
      (i) means for coupling each of said subsystems to said apparatus,
      (ii) means for acquiring precalibration, accuracy and system noise data of said subsystems,
      (iii) means for communicating with said processing unit,
      (iv) means for monitoring stability of said calibration updates by using accuracy information obtained from Lange's sparse-matrix inversion of said Filter(s), and
      (v) means for selecting those of said subsystems whose calibration updates exhibit a proper convergence, and thereby providing a stable calibration for said selected integral parts of said state-finding system coupled to said apparatus.

3. A method for calibrating readings of a large centralized sensor system by Kalman filtering, the sensor output units providing signals in response to external events and where the number of simultaneously processed sensor output signal values in excess of 50, the method comprising the steps of:
   a) providing a data base unit for storing information on:
      a plurality of test point sensor output signal values for some of said sensors and a plurality of values for said external events corresponding to said test point sensor output values;
      simultaneous time series of said readings from adjacent sensors for comparison;
      said readings accompanied with their calibration parameters and values for said external events corresponding to a situation; and, controls of said sensors and changes in said external events corresponding to a new situation;

b) providing a logic unit for accessing said readings with said calibration parameters, said logic unit having a two-way communications link to said data base unit, and computing initial values for unknown calibration parameters and their accuracy estimates by using Lange's High-pass Filter as required;

c) providing said sensor output signal values from said sensors, as available, to said logic unit;

d) providing information on said controls and changes to said data base unit;

e) accessing current values of said calibration parameters and computing by using the Fast Kalman Filter (FKF) formulas obtained from Lange's sparse-matrix inversion formula, in said logic unit, updates of said calibration parameters, values of said external events and their accuracies corresponding to said new situation;

f) controlling stability of said Kalman filtering by monitoring said accuracy estimates, in said logic unit, and by indicating need for new test point data, comparisons or a system reconfiguration, g) calibrating those of said sensor readings for which stable calibration parameters are available.

* * * * *